W. L. McGRATH & G. W. CLARK.
BICYCLE STAND.
APPLICATION FILED SEPT. 25, 1914.

1,130,094.

Patented Mar. 2, 1915.

Witnesses.
Adolph C. Kaiser
Myrtle E. Fallow.

Inventors.
William L. McGrath
George W. Clark
Harry P. Williams
Atty.

UNITED STATES PATENT OFFICE.

WILLIAM LOUIS McGRATH AND GEORGE W. CLARK, OF WESTFIELD, MASSACHUSETTS, ASSIGNORS TO GEORGE POPE, CHARLES A. MORSS, AND CHARLES A. PERSONS, RECEIVERS FOR THE POPE MANUFACTURING COMPANY, IN THE DISTRICT OF MASSACHUSETTS.

BICYCLE-STAND.

1,130,094. Specification of Letters Patent. Patented Mar. 2, 1915.

Application filed September 25, 1914. Serial No. 863,545.

*To all whom it may concern:*

Be it known that we, WILLIAM L. McGRATH and GEORGE W. CLARK, both citizens of the United States, residing at Westfield, in the county of Hampden and State of Massachusetts, have invented a new and useful Improvement in Bicycle-Stands, of which the following is a specification.

This invention relates to a stand for holding a bicycle upright when stationary, which is permanently attached to and is carried by the machine.

The object of the invention is to provide a very simple, cheap and light stand which is adapted to be attached to and carried by a bicycle for supporting the bicycle when it is stationary, and which may be held raised above the ground when the bicycle is being ridden, even should the machine have no mudguard.

Figure 1:
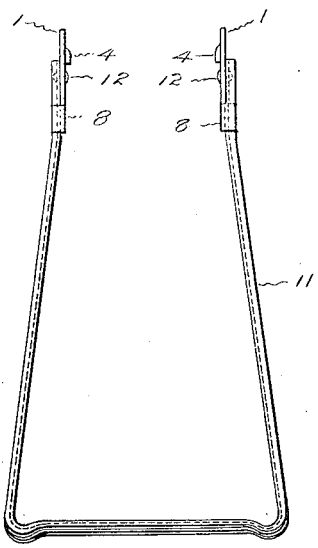
Figure 2:
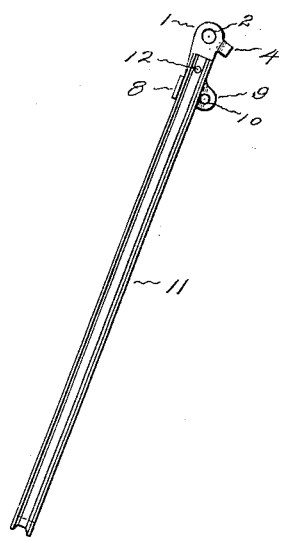
Figure 3:
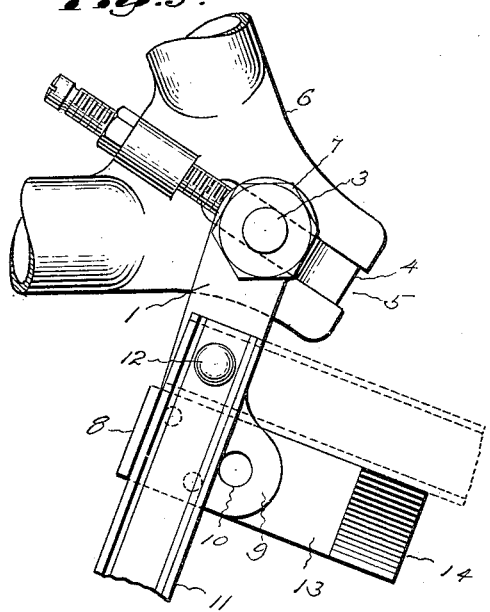
Figure 4:
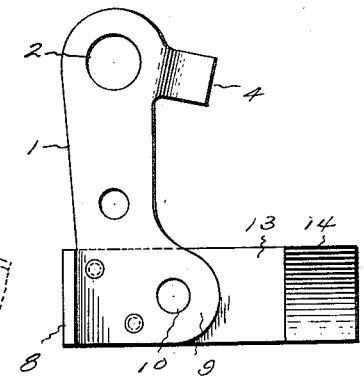
Figure 5:
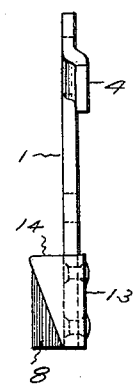

Figure 1 of the accompanying drawings shows a front elevation of a stand which embodies the invention. Fig. 2 shows a side elevation of the same. Fig. 3 shows on a larger scale one of the brackets attached to the rear toe-piece of a bicycle, illustrating in full lines the relative positions of the parts when the frame is down and the stand is in use, and in dotted outline the relative positions when the frame is raised and not in use. Fig. 4 is a side view of a bracket provided with a spring latch for holding the frame lifted. Fig. 5 is an edge view of the bracket.

The brackets 1 to which the stand frame is hinged have perforations 2 adapted to fit the rear axle 3 of the bicycle to which the stand is to be attached. Extending from one side of the upper end of each bracket is a lug 4, which is of such shape and size and is so inset from the bracket that it will fit into the slot 5 of the rear toe-piece 6 of the bicycle frame, through which the rear axle passes. When the nuts 7 are turned up the brackets are held on the axle and are prevented from turning by the lugs which extend into the toe-piece slots. Bent outwardly from one edge near the lower end of each bracket is a lug 8 and extending on the other edge from the lower end of each bracket is an ear 9 with a perforation 10.

The frame 11 is bent to shape from a piece of channel iron, with its bottom somewhat wider than its top. The upper ends of the frame are fastened to the brackets by rivets 12, upon which the frame is free to swing.

The stand is attached to a bicycle by slipping the brackets, with the pivoted frame, upon the ends of the rear axle.

When the stand is attached and the frame is swung down with its lower end on the ground slightly forward of the rear axle of the bicycle the edges of the frame engage with the stop lugs, which project out from the brackets. With the parts in this position the bow of a padlock may be put through the hole in the ear so as to prevent the theft of the machine. If it is desired to ride the machine the frame is swung back and lifted above the ground, and a pin, or other suitable means, is thrust through the hole in the ear to hold the frame up. Instead of holding the frame lifted by means of a piece inserted into the hole, spring latches 13 may be fastened to the brackets so they will extend out and their ends 14 will snap under the edges of the frame when it is raised.

The invention claimed is:—

1. A bicycle stand comprising brackets provided with openings for an axle and inset lugs adapted to fit into slots in the frame of the machine with which the stand is to be used, a bow shaped frame with its upper ends pivoted to the brackets, and lugs extending outwardly from the brackets for forming stops, which limit the forward swinging of the frame.

2. A bicycle stand having brackets with openings for receiving an axle and inset lugs adapted to set into slots in the frame of the machine with which the stand is to be used, a bow shaped frame with its ends hinged to the brackets, lugs projecting outwardly from the brackets and forming stops which limit the forward swinging of the frame, and means connected with the brackets whereby the frame may be held up when the bicycle is in use.

3. A bicycle stand having brackets with perforations whereby the brackets may be placed on the axle of the machine with which the stand is to be used and having inset lugs adapted to fit into slots in the machine frame, a frame with its upper ends hinged to the brackets, lugs projecting outwardly from the brackets for limiting the forward swinging of the frame, and perforated ears on the brackets providing means whereby the frame may be locked in its forward position, or may be held lifted in its rear position.

WILLIAM LOUIS McGRATH.
GEORGE W. CLARK.

Witnesses:
J. P. FOGARTY,
FRANK B. RAN.

Copies of this patent may be obtained for five cents each, by addressing the " Commissioner of Patents, Washington, D. C."